United States Patent [19]
Abdelmalek

[11] Patent Number: 5,466,270
[45] Date of Patent: Nov. 14, 1995

[54] CYCLONIC CENTRIFUGAL GAS SEPARATOR - ABSORBER APPARATUS FOR BOILER FLUE GAS CLEANING

[76] Inventor: Fawzy T. Abdelmalek, 12807 Willowyck Dr., St. Louis, Mo. 63146

[21] Appl. No.: 251,277

[22] Filed: May 31, 1994

Related U.S. Application Data

[63] Continuation-in-part of Ser. No. 977,138, Nov. 16, 1992, Pat. No. 5,321,946, and Ser. No. 11,870, Feb. 1, 1993, Pat. No. 5,403,569.

[51] Int. Cl.⁶ .......................... B01D 45/16; B01D 47/06
[52] U.S. Cl. .................. 55/238; 55/257.7; 55/259; 55/269; 95/214; 95/220; 261/79.2; 423/242.7
[58] Field of Search ............... 55/237, 238, 267–269, 55/257.7, 259; 261/79.2; 423/242.7; 95/214, 216, 219, 220, 268, 288, 271

[56] References Cited

U.S. PATENT DOCUMENTS

| | | | |
|---|---|---|---|
| 2,800,974 | 7/1957 | Gilman et al. | 95/219 X |
| 3,412,529 | 11/1968 | Tailor | 95/219 X |
| 3,904,735 | 9/1975 | Atwood et al. | 423/242.7 |
| 3,933,450 | 1/1976 | Percevaut | 55/238 X |
| 4,059,419 | 11/1977 | Ross | 261/79.2 X |
| 4,065,527 | 12/1977 | Graber | 55/238 X |
| 4,382,807 | 5/1983 | Diachuk | 55/238 X |
| 4,734,109 | 3/1988 | Cox | 55/238 X |
| 5,133,190 | 7/1992 | Abdelmalek | 60/648 |
| 5,146,755 | 9/1992 | Abdelmalek | 60/655 |
| 5,321,946 | 6/1994 | Abdelmalek | 60/648 |

*Primary Examiner*—Richard L. Chiesa
*Attorney, Agent, or Firm*—Peoples, Hale & Coleman

[57] ABSTRACT

Sulfur dioxide in flue gas exhaust stream from fossil fueled boiler, is absorbed by a regenerative organic solvent in a centrifugal gas separator-absorber.

1 Claim, 2 Drawing Sheets

CYCLONIC CENTRIFUGAL GAS SEPARATOR - ABSORBER APPARATUS FOR BOILER FLUE GAS CLEANING

RELATIONSHIP TO OTHER PATENT APPLICATIONS

This application constitutes a continuation in part of my U.S. patent application Ser. No. 07/977,138 filed on Nov. 16, 1992, now U.S. Pat. No. 5,321,946, and 08/011,870 filed on Feb. 1, 1993, now U.S. Pat. No. 5,403,569.

BACKGROUND OF THE INVENTION

1. Field of the Invention

The present invention is a continuation in part of my U.S. patent application Ser. Nos. 07/977,138 filed on Nov. 16, 1992, now U.S. Pat. No. 5,321,946, and 08/011,870 filed on Feb. 1, 1993, now U.S. Pat. No. 5,4.03,569 in which I disclosed methods for clean-up of a boiler flue gas stream utilizing cooling and condensing processes to remove its acidic water vapor, and separating sulfur dioxide and carbon dioxide contained therein by thermodynamic equilibria and liquefaction processes. More particularly it relates to a method for removing the sulfur dioxide from the flue gases in a centrifugal cyclonic gas separator-absorber by a regenerative organic amine absorbent that can be recovered, purified and recycled. The absorbed sulfur dioxide is stripped from the absorbent, dehumidified, liquefied and recycled.

2. Description of the Prior Art

The present invention employs a thermally regenerative organic based amine absorbent to absorb most of the sulfur dioxide contained in the flue gases in a cyclonic centrifugal gas separator-absorber. The $SO_2$ contained in the flue gas is enriched in a heavier fraction of gas along the perimeter wall of the cyclone structure. The process will enhance absorption and removal of $SO_2$ at much lower energy consumption rate when compared with other flue gas desulfurization systems. In the past regenerative adsorbents have been used for scrubbing sulfur oxides ($SO_x$) and nitrogen oxides ($NO_x$) from flue gases containing carbon dioxide, and other flue gas pollutants. U.S. Pat. No. 3,904,735 disclosed a system for selectively removing sulfur dioxide from a flue gas mixture by employing an alkaline nitrogen based, thermally regeneratable organic amine as Triethanolamine or (CANSOLV™), for an absorbent in a sulfur dioxide recovery scrubbing process. Aqueous scrubbing regenerative cycles have been the basis of most commercial regeneratable flue gas desulfurization (FGD) processes, such as when using sodium sulfite in aqueous media. Sulfur dioxide undergoes reversible hydration and ionization reactions, the sodium ion does not participate in the reaction, its role being to provide electrical neutrality to the solution. The absorption of $SO_2$ directly with aqueous sodium based liquor requires a large amount of water, which will have to be stripped with the $SO_2$. Because of the vapor pressure of water in the scrubbing liquor is much higher, co-stripping of a large amount of water wastefully consumes a great amount of energy, this makes many traditional regenerative processes not cost effective.

In the prior art other soluble cation as the triethanolamine ion has been used in enumerated nitrogen based regeneratable absorbent compounds for flue gas desulfurization systems. A commercially known regenerative organic amine absorbent (CANSOLV™) has been developed by Union Carbide Chemicals and Plastics Company. In the CANSOLV™ process, the untreated flue gas leaving a particulate removal device; a dust collector or electrostatic precipitator; at above 270° F. is first scrubbed by water, and then by aqueous solution of the $SO_2$ absorbent, both the water and the $SO_2$ absorbent are atomized through high pressure nozzles in flue gas duct section, each duct section has a mist elimination equipment to remove the rich $SO_2$ absorbent liquor droplets from the gas stream. The treated gas is released to the chimney. In the water scrubbing duct section part, the water mist evaporates to effect cooling and humidifying the flue gases. The water absorbs any chlorides, fluorides, sulfurous acid and removes any trace metals and ultra fine particulate matter released from the dust collector. In the $SO_2$ absorber duct section, the $SO_2$ is scrubbed from the flue gas by contact with the atomized absorbent mist, the rich $SO_2$ absorbent liquor is removed and regenerated through application of heat, and stripping of the $SO_2$. Unlike the present invention, in the CANSOLV™ process; large amount of water is needed for scrubbing, cooling, and cleaning the flue gas stream leaving the electrostatic precipitator or any other particulate control device. The present invention provides means for condensing the acidic water in the flue gases through energy recovery, and provides an increased rate of $SO_2$ absorption by employing a centrifugal gas separator-absorber which increases the gas pressure, and provides cooling for a heavier fraction of gas which contains higher concentration of $SO_2$.

The present invention is based on employing alkaline organic amine (Triethanolamine or other nitrogen based ion similar to the CANSOLV™) to remove up to 99% of the sulfur dioxide, at a relatively higher flue gas velocity, a relatively lower liquid to gas ratio (L/G), much lower energy consumption rates, and reduced power requirements. When compared with separating and liquefying the sulfur dioxide by processes as disclosed in my U.S. patent application Ser. No. 977,138, the improvement of the present invention is using an organic amine absorbent sprayed inside a cyclonic centrifugal gas separator-absorber. The centrifugal gas separator-absorber features air atomizing nozzles mounted at the perimeter of the upper cylindrical intake chamber of the separator. The increased concentration of the sulfur dioxide in a heavier fraction of gas mixture, the higher pressure and cooling effect of the heavier gas fraction at the perimeter wall of the cyclonic separator-absorber, enhances the absorption of the sulfur dioxide. A heavier gas fraction laden with a rich $SO_2$ solvent liquor flowing from the bottom of the gas separator-absorber is removed, the rich $SO_2$ solvent liquor is separated, clarified or filtered, and is then regenerated by heating and stripping into a vacuum stripping column. The stripped $SO_2$ gas laden with water vapor is removed from the top of the stripping column, and the regenerated absorbent liquor is removed from the bottom and recycled.

Similar to other regenerative organic absorbent processes used in the past, the organic absorbent must be nonvolatile, having a very low vapor pressure to prevent vapor losses in the vacuum stripping step. The absorbent liquor capacity to remove the $SO_2$, normally decreases in the presence of acids introduced in the absorbent, these acids include sulfuric acid ($H_2SO_4$), hydrochloric acid (HCL), fluoride acid (HF), and nitric acid ($HNO_3$). Unlike the prior art; in the present invention most of these acids are removed from the flue gas stream in a condensing heat exchanger prior to entering the cyclonic gas separator-absorber. This step of the flue gas cooling and condensing, removes most of the acid vapors prior to the absorption step, this minimizes the formation of any heat stable acid salts in the absorber due to reactions of the acids with the amine absorbent.

Organic amine adsorbents can exhibit high selectivity for absorbing sulfur dioxide in the presence of carbon dioxide, oxygen, and other flue gas components. Their low liquid to gas molar ratio (L/G), and their excellent stable stripping characteristics made them particularly appeal to the present invention. To maintain the highest possible absorbing capacity of an amine absorbent, it is important to control the water and acids introduced in the absorbent liquor to a required molar balance with the sulfur dioxide.

Since Organic amine solvents are commercially established and available, the process designer can evaluate and make the selection of the absorbent for the process. The physical and chemical composition of the solvent, its absorption, and regeneration characteristics are considered outside the scope of this application.

Figure 1:
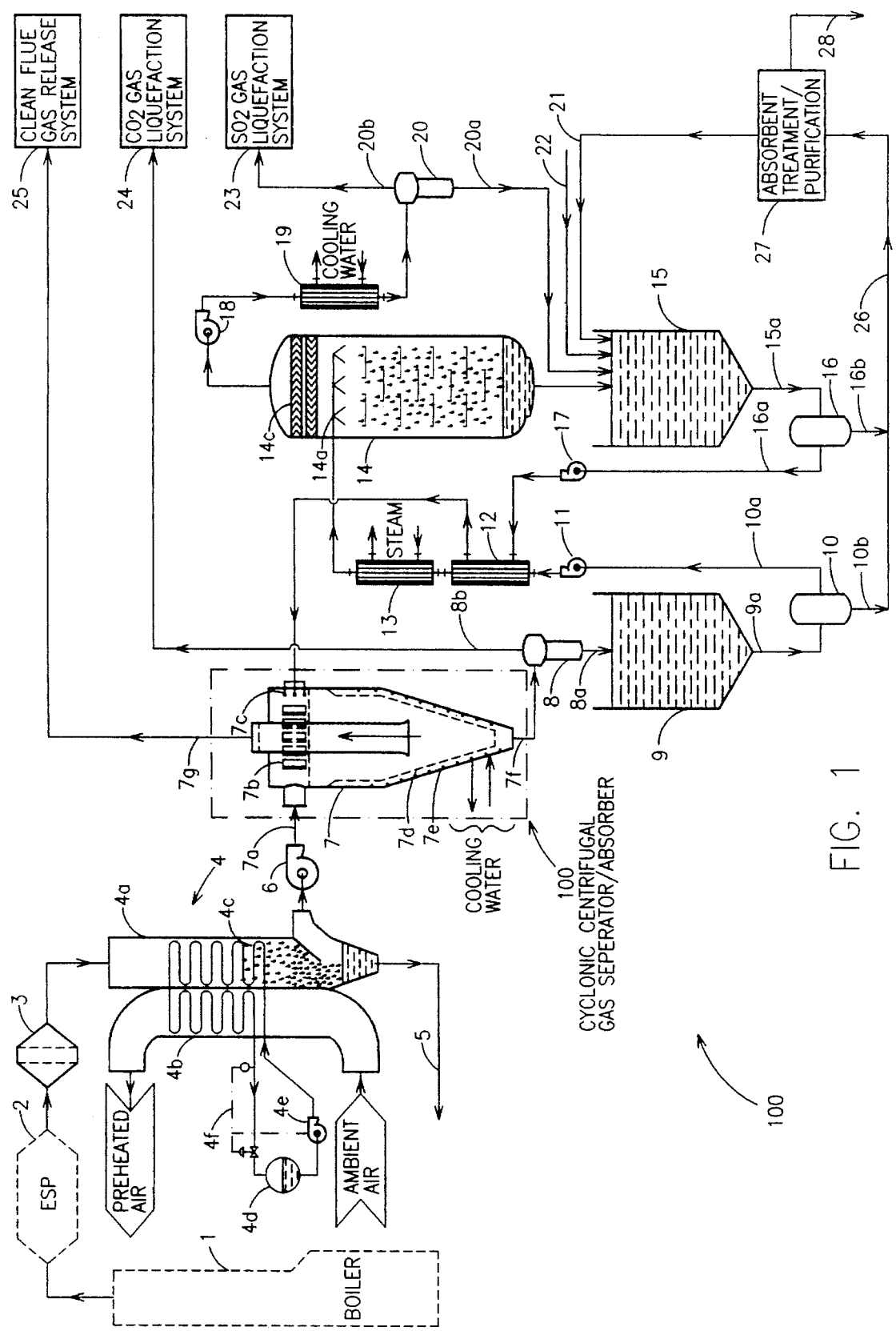
FIG. 1: Is a schematic flow diagram for the flue gas desulfurization by absorption and liquefaction processes.

It is further a principle object of the present invention to provide a condensing reversible heat exchanger which employs an active evaporative thermal fluid in a closed circuit, to cool and condense most of the acidic vapors emitted from a boiler flue gas stream, while recovering its sensible, and latent heat to preheat a boiler combustion air stream.

It is also a principle object of the present invention to provide a flue gas separator-absorber apparatus to remove most of the sulfur-dioxide contained in an enriched carbon dioxide gas stream.

It is further an object of the present invention, to absorb most of the sulfur dioxide contained in a flue gas stream by employing an organic amine absorbent injected by air atomizing nozzles in a centrifugal gas separator-absorber.

It is further an object of the present invention to conserve energy, improve efficiency, and reduce heat rate of fossil fueled power plants while cleaning a boiler flue gas stream.

The above, and other objectives and advantages of the present invention will become apparent from the following specifications, drawings, and claims. It will be understood that particular embodiments of the invention are shown by way of illustration only and are not as limitations of the invention. The principle features of this invention, may be employed in various embodiments without departure from the scope of the invention.

DETAILED DESCRIPTION OF THE PREFERRED EMBODIMENT

When a boiler flue gas stream is cooled, its nitric oxide (NO) is oxidized and dissolved in water to form weak nitric acid ($HNO_3$), part of the sulfur dioxide ($SO_2$) is oxidized and dissolved in water to form sulfurous acid ($HSO_3$). In the presence of trace metal species, countercurrent, and consecutive reactions take place, and result in forming dilute sulfuric acid, and metal sulfate and sulfite compounds, which end up in the water vapor condensate stream, and can be treated and properly disposed.

In the present invention, the flue gas stream flowing from a boiler is cooled, most of its acidic water is condensed, its sensible and latent heat is exchanged in a reversible heat exchanger to preheat a combustion air stream by employing active thermal fluids in closed circuits. The advantages of using an active fluid reversible heat exchanger for this application include high effectiveness, compactness, no moving parts, and complete separation between the boiler flue gas and combustion air streams. The type, and thermodynamic characteristics of the heat transfer working fluids will vary with the application and the temperature range. For the purposes of the present invention; a variety of evaporative working fluids may be used, water is a preferred working fluid for flue gas temperature range from 250° F. to up to 1000° F., other evaporative fluids similar to ammonia may be used for lower temperature ranges. A reversible heat exchanger employs active evaporative fluids, providing higher heat transfer rates and, a smaller temperature gradients, the exchange heat transfer capability is a function of the evaporative fluid thermodynamic property, and the heat exchanger pipe materials.

The cooled and dehumidified flue gas stream flowing from the condensing heat exchanger section at a temperature below 120° F., enters a centrifugal cyclonic gas separator-absorber. A regenerative amine absorbent is sprayed through air atomizing nozzles in the flue gas stream along the perimeter of the inlet chamber of a centrifugal gas separator-absorber. The $SO_2$ contained in a heavier gas fraction migrates in a radial direction toward the perimeter wall of the separator, and is instantly absorbed by the amine solvent liquor while diffusing under a steep centrifugal force into a cooled space between a diffusing screen and the perimeter wall. The cooling of the heavier fraction of the flue gas migrating through the diffusing screen will further cause an effect of a thermal mass diffusion enhancing the separation of the heavier gas fraction. The increased $SO_2$ concentration, the increased pressure and the cooling effect imposed on the heavier fraction of the gas stream, enhances the absorption rate, to completely absorb the $SO_2$ contained therein over a relatively short vertical distance along the perimeter cyclone wall. The heavier gas fraction laden with the rich $SO_2$ absorbent mist flowing from the bottom of the cyclone enters a mist separator where the rich $SO_2$ liquor is removed and then purified by filtering processes. The clean rich $SO_2$ liquor is then pressurized and heated to about 180° F. before being atomized in a vacuum gas stripper. A mixture of stripped $SO_2$ gas, and water vapor flowing from the top outlet of the vacuum stripper is cooled through a water cooled or refrigerated condenser to remove most of the water vapor contained therein. The $SO_2$ is then compressed and cooled to cause its liquefaction. The water vapor condensate is returned to the process to maintain a required water content in the absorbent liquor. The gas vacuum stripping column may be either trayed or packed type. An absorbent purification system is employed to remove any acids, and any heat stable salts contained in the lean $SO_2$ absorbent by treatment of a slip stream of about 1% of the mass flow rate of the absorbent liquor. A stoichiometric quantity of aqueous potassium hydroxide or aqueous potassium carbonate results in 99.99% recovery of the absorbent, this chemical treatment process is commercially known and its detail is not disclosed herein.

In the treatment with potassium ion, precipitation of potassium sulfate can be removed from the liquor by conventional means of filtration, and the reclaimed absorbent solvent is then returned to the absorption process. In the present process, as has been required by prior art amine regeneratable absorbent processes, the relative high velocity of the organic amine solvent requires careful design and selection of the high pressure air atomizing equipment, side reactions which may cause decomposition and polymerization of the solvent can be avoided by maintaining the temperature of the solvent below 200° F., preferably 180° F., and maintaining its water content at a level of at least one mole per mole of $SO_2$ and $SO_3$ present in the absorbent liquor. Because the vapor pressure of the water contained in the same liquor is much higher, $SO_2$ is co-stripped with the water vapor; an increase of the water content in the absorbent liquor will result to an increase in the energy requirements for co-stripping the water content with the $SO_2$.

A controlled amount of fresh absorbent must be added to the regenerated absorbent to make-up for the losses throughout the system. The organic amine solvent characteristics must combine a low molecular weight, and a high concentration, to result in a high $SO_2$ removal ratio. The $SO_2$ removal ratio by the present process can range between 0.5 to 1.0 lbs. $SO_2$ per each gallon of the absorbent resulting in $SO_2$ removal at a very low liquid to gas molar ratio (L/G) of about 1 gallon/1000 ACFM. The regenerated absorbent composition consists of about 70 to 80 weight present amine solvent, about 5 to 10 weight percent water, about 10 to 20 weight percent sulfur dioxide, and up to 10 weight percent mixture of acids introduced into the absorbent. The molar weight of the $SO_2$ to be absorbed therein must not exceed the molar weight of the water contained in the lean $SO_2$ absorbent.

In the present invention, the desulfurized heavier gas fraction flowing from the flue gas centrifugal separator-absorber enters a mist separator, then conducted to a gas liquefaction plant to liquefy the already enriched carbon dioxide gas contained in the heavier gas mixture for shipping as a by-product of the process.

The aqueous acidic water effluents from the condensing heat exchanger, and from the absorbent purification system containing flyash, acids, salts and heavy metals, are continuously removed by conventional water treatment chemical processes. The purified and regenerated absorbent are continuously recycled in the process. The liquid and solid wastes resulting from this process will account to less then 1% of that produced by other conventional limestone flue gas scrubbing systems.

OPERATION

FIG. 1 indicates a schematic flow diagram for a flue gas cleaning system 100. The flue gas stream flowing from a boiler or other fossil fuel burning facility 1, is received after removing its particulate matter in an electrostatic precipitator, or a dust collector 2, and is then conducted to enter an electrostatic gas treater 3, where the electromagnetic charges of its ultra-fine submicrone particulate matter is neutralized to enhance coagulation of the particles, and to prevent its adherence to the metallic surfaces of the heat exchanger elements. The treated gas enters a cooling section 4a of a reversible heat exchanger 4. In the cooling section 4a, the flue gas temperature is reduced to near or below the ambient temperature to cause acceleration of the oxidation process of the nitric oxide (NO), which when cooled it reacts with the excess oxygen ($O_2$) and forms nitrogen dioxide ($NO_2$). At near ambient low temperature range, nitrogen dioxide reacts readily with the water vapor to form weak nitric acid ($HNO_3$), under the same circumstances, a part of the sulfur dioxide form sulfurous ion ($SO_3$), which dissolves in water to form sulfurous acid ($HSO_3$), and together in the presence of trace heavy metal species, they react to form sulfates diluted sulfuric acid ($H_2SO_4$) and metal sulfates, and they end up in forming dilute acidic water stream 5, which can be contained, removed, treated and recirculated in the cooling tower system. The reversing heat exchanger 4 employs an active evaporative thermal fluid to cool down a relatively hot flue gas stream and heat up a relatively cold combustion air steam. The relatively hot flue gas steam; at above 270° F.; enters a cooling section 4a to cool down approaching the ambient air temperature, and the relatively cold combustion air stream; at ambient temperature; enters a heating section 4b to heat up to a temperature approaching the relatively high temperature of the incoming flue gas stream.

The evaporative thermal fluid is contained in a closed circuit, consisting of a heat exchanger coil and conduit 4c, a thermal fluid storage tank, a fluid recirculating pump 4e, and a flow control system 4f.

Depending upon the ambient temperature conditions; approximately 65 to 75% of the acidic water vapor contained in the flue gas stream will condense. The heat recovered by the combustion air stream will contribute to approximately an 8 to 9% reduction in the heat rate of a basic steam power plant heat cycle. Condensation of acidic water vapors contained in the flue gas stream will occur on the metal surfaces of the heat exchanger 4c at temperatures below the dew point of the condensing vapor, even at flue gas temperatures higher than its water vapor dew point, condensation will occur at a relatively colder metal surfaces of the condensing heat exchanger. The reversible heat exchanger cooling section can be divided into three temperature condensing zones; a high temperature zone where condensing temperatures are above 200° F.; a medium temperature zone where the condensing temperatures are above 100° F. and below 200° F.; and a low temperature zone where the condensing temperature are below 100° F. Most of the acidic water vapor condensation will occur at relatively lower temperatures in the medium and low temperature zones. The lower the temperature of the heat exchanger surface, the more liquid washing effect, and the lesser the corrosion will occur. The higher the condensing temperature (above 200° F.) the more aggressive corrosion environment will occur. To effectively reduce the corrosion and increase the life cycle of the heat exchanger, the heat exchanger elements must be constructed from suitable high corrosion resistant materials, and must be cleaned by intermittent wash cycles, using high pressure water or steam spray nozzle system. The interior of the flue gas cooler enclosure may be protected with corrosion resistant coating or constructed from corrosion resistant materials.

The cooled, and dehumidified flue gases flowing from the gas cooling Section 4a is then conducted by a pressure blower 6 to enter a gas separator-absorber 7. The separator-absorber 7 has an inlet 7a, aerodynamic guide vanes 7b, absorbent spray nozzles 7c, a diffusing gas screen 7d, and a cooling coil 7e. The cooling coil 7e is located in a space between the diffusing screen 7d and the perimeter outer wall of the gas separator. A heavier gas fraction, basically an enriched carbon dioxide mixture of gases containing a rich $SO_2$ absorbent mist is swept from the bottom outlet 7f. The massflow of the bottom heavier gas fraction sweep stream will account to about 25% to 50% of the main flue gas stream emitted from the boiler, and will consist of about 25% to 45% carbon dioxide, 1% to 4% oxygen, 50% to 65% nitrogen, and other traces of the flue gas components. The rich $SO_2$ absorbent liquor flowing with the heavier gas sweep stream is separated in a moisture separator 8, and drained from the bottom outlet 8a to a storage tank 9. The separated heavier gas stream flowing from the top outlet 8b of the moisture separator 8 is then routed to enter a carbon dioxide gas liquefaction plant 24.

A self-cleaning pressure filter 10, removes any flyash, and thermal stable salts that may exist in the rich $SO_2$ liquor. A 1% slip stream 26 is conducted to a treatment and purification unit 27. The purified stream is returned back to the process via line 21. A relatively very small volume of acid heat stable salts are removed as by-products via line 28. The cleaned rich $SO_2$ absorbent liquor stream flowing from filter 10 is then pressurized by a pressure pump 11, through a heat exchanger 12. The heat exchanger 12 is employed to cool a lean $SO_2$ absorbent stream while heating of a rich $SO_2$ absorbent stream. The preheated rich $SO_2$ stream is further heated by a steam re-heater heat exchanger 13 to increase its temperature to about 160° to 200° F., before being atomized into a vacuum stripping column 14 through air atomizing nozzles 14a. The stripping column 14 can be of a commercially available trayed or packed type. The lean $SO_2$ absorbent liquor is continuously drained from the bottom of the stripping column into a storage tank 15. A self-cleaning pressure filter 16 removes any solids or precipitated salts, a slip stream of the lean absorbent liquor flowing from outlet 16a is routed via line 26 to the absorbent treatment and purification unit. The lean $SO_2$ absorbent liquor stream 16a is then pressurized by a pressure pump 17 through the heat exchanger 12, where it is cooled to a relatively lower temperature of about 120° F. before being atomized inside the centrifugal gas separator-absorber 7. The stripped $SO_2$ laden water vapor flowing through a mist eliminator 14c at the top outlet of the stripping column 14 is removed by a vacuum pump 18, and then pumped to enter through water or a refrigeration cooled condenser 19 to effectively condense and remove most of the water vapor in a moisture separator 20. The dehumidified $SO_2$ gas is then routed to a liquefaction unit 23, and the water vapor condensate from the moisture separator bottom outlet 20a, is routed back to tank 15. A make-up stream of treated water and a fresh absorbent 22 is added to maintain the required composition of the lean $SO_2$ absorbent liquor, and to make-up for any losses that may occur throughout the process. The cleaned gas stream flowing from the top of the flue gas separator-absorber 7 is continuously disbursed through a cooling tower gas release system 25.

Figures 2, 2A:
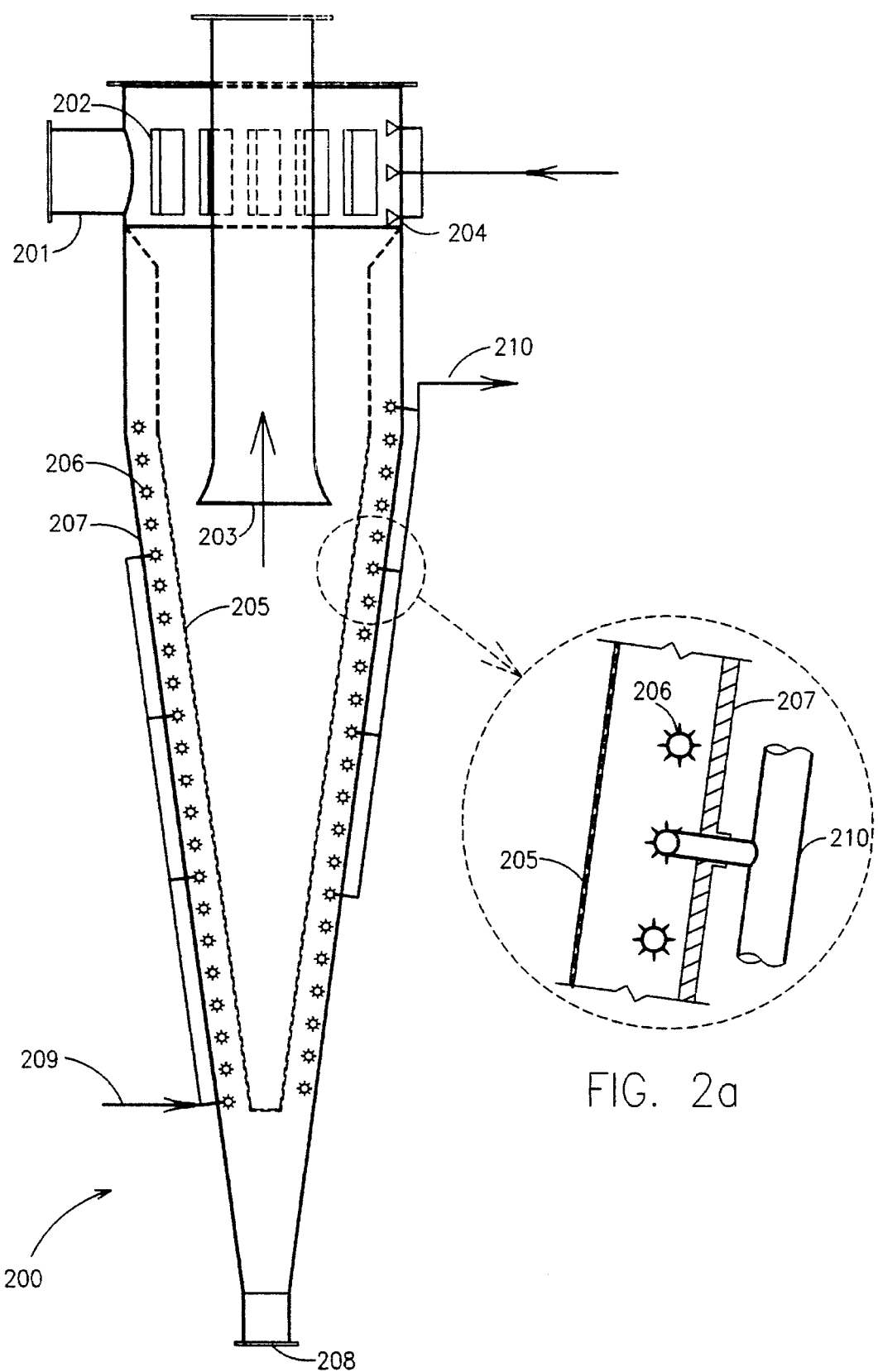
FIG. 2: Is a schematic diagram for a centrifugal gas separator-absorber.
FIG. 2a: is an enlarged view of the cooled space at the separator-absorber perimeter wall. SUMMARY OF THE INVENTION It is therefore a principle object of the present invention to provide an improved flue gas cleaning system which employs flue gas cooling, absorbing and liquefying processes for removing of the sulfur dioxide contained therein.

FIG. 2 indicates a schematic diagram for a centrifugal gas separator-absorber system 200, its simple design and compact geometry is dictated by the high velocity, and the high mass transfer of the flue gas. The lack of moving parts should lead to a reliable low maintenance operation. Tangential inlet 201 and aerodynamic guide vanes 202, are installed and positioned to provide a high velocity and a stream lined mass flow of the flue gas entering the separator-absorber. Outlet tube 203 is simply an open round pipe having a bell shaped inlet protruding into the cyclone part of the separator-absorber. High pressure air atomization nozzles 204 are placed axially along the perimeter wall of the upper cylindrical inlet chamber, and positioned to inject an amine regenerative absorbent liquor tangentially in the same direction as of the flue gas tangential inlet flow. A relatively heavier gas fraction laden the atomized absorbent mist migrates radially, and diffused through a diffusing screen 205 into an outer cooled space enclosed between the perimeter wall and the diffusing screen. A spiral coiled heat exchanger having extended longitudinal heat exchange fins, is placed behind the diffusing screen 205. A heat transfer cooling fluid; chilled water or alike; continuously circulates in the cooling coil 207 through an inlet 209 and an outlet 210. A cooled heavier fraction of the flue gas laden the rich $SO_2$ liquid absorbent moves downward in a spiral motion towards the bottom outlet of the separator-absorber. A thin layer of the absorbent liquor will form on the inside surface of the diffusing screen 205, this layer will continuously bubble and expand through the diffusing screen, resulting in a two phase flow field, and producing a very high and more vigorous interaction between the absorbent and the heavier gas fraction. The gas diffusion effect applied by the centrifugal force, and the thermal diffusion effect applied by the cooling and condensing of water vapor contained in the outer layer of a relatively heavier gas fraction, enhance the separation process and increase the absorption rate of the sulfur dioxide by the amine absorbent.

Absorbent loss via the relatively lighter clean gas stream flowing through the central exist tube 203 is minimized because of the relatively high mass flow of the heavier gas fraction swept from the bottom outlet, any carry over of mist can be completely eliminated by proper design of the aspect ratio of the separator and by decreasing the release velocity of the vented cleaned gas stream. It should be understood to those who are skilled in the art, that many variables can affect the performance of the gas separator-absorber, these variables include, but not limited to, the inlet aspect ratio size and shape, size of the cylindrical and conical sections, the shape and number of the gas inlet guide vanes, the size and length of the central exit tube, the size and shape of the diffusing holes of the diffusing screen, and the velocity, and the pressure drop through the separator-absorber.

What is claimed:

1. A cyclonic flue gas centrifugal separator-absorber apparatus for separating and discharging a relatively heavier gas fraction laden with a rich sulfur dioxide absorbent liquor flowing downwardly along its perimeter to a bottom outlet, and venting a relatively lighter gas fraction flowing upwardly from its center to a top outlet; said centrifugal separator-absorber structure comprises:

a. A cylindrical inlet chamber having means for receiving a tangential flow pattern of a flue gas stream flowing under relatively higher inlet pressure through a set of aerodynamic guide vanes positioned to cause a directional outward centrifugal effect;

b. A rectangular inlet part having means for directions said relatively higher pressure flue gas stream to enter tangentially into said cylindrical inlet chamber;

c. A lean sulfur dioxide absorbent liquor atomizing nozzles system, placed along the perimeter of said inlet chamber;

d. A cyclone part having means for causing a spiral downward gas flow pattern;

e. A diffusing screen mounted inside the cyclone part to cause mass diffusion of a heavier gas fraction laden with said absorbent liquor into a perimeter space enclosed between the diffusing screen and the outer wall of the cyclone under the effect of a steep centrifugal pressure gradient;

f. A cooling system utilizing a low temperature heat transfer fluid circulating in a spiral coil placed behind the diffusing screen to cause cooling effect and condense vapors contained in the centrifugally diffused heavier gas fraction and cause thermal diffusion to enhance migration of the heavier gas fraction into said perimeter space along the outer wall of the cyclone;

g. A bottom cyclone outlet to allow discharge of the relatively heavier gas fraction laden with the sulfur dioxide absorbent liquor to exit downwardly at a lower gas pressure relative to its higher inlet pressure;

h. Said top outlet comprising a top round outlet having a bell shaped inlet protruding inside the said cyclone to allow discharge of the relatively lighter gas fraction exiting upwardly at a lower gas pressure relative to its higher inlet pressure.

\* \* \* \* \*